United States Patent Office 2,936,481
Patented May 17, 1960

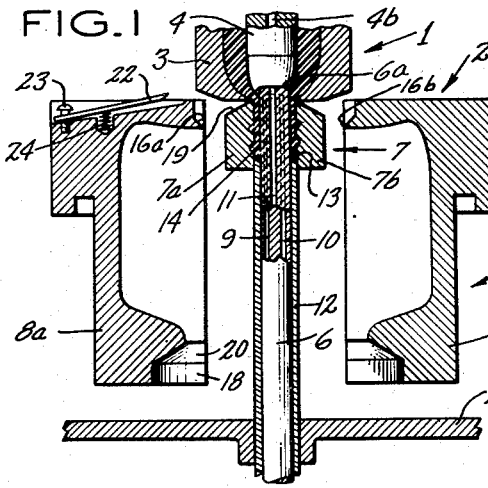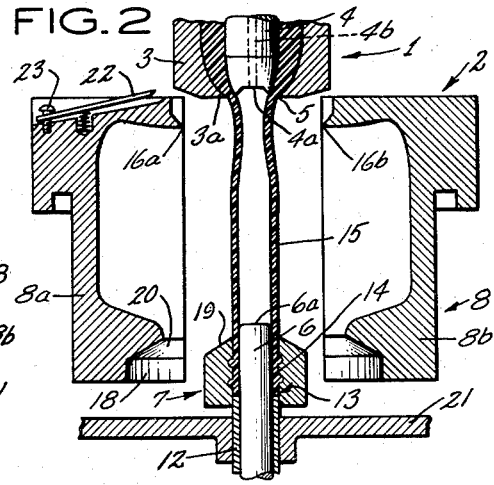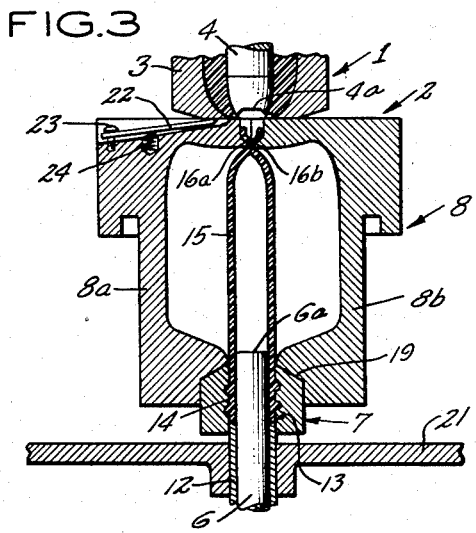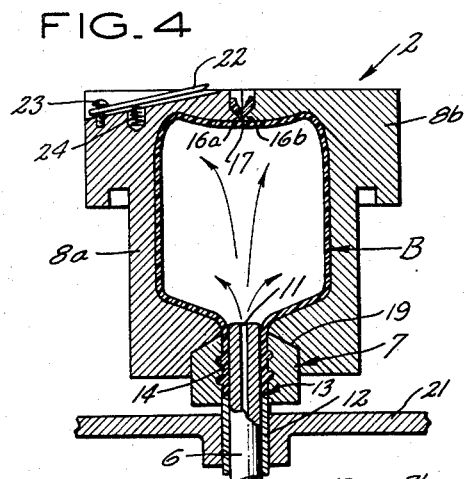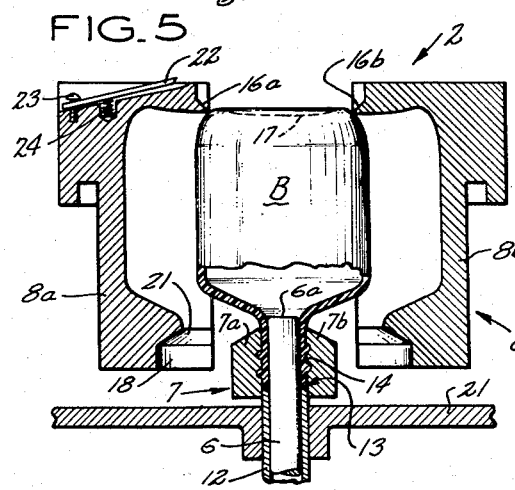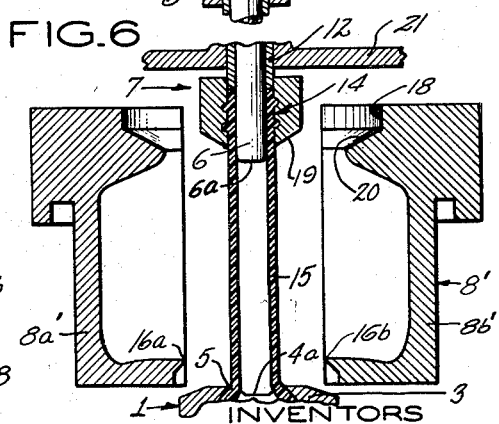

2,936,481
BLOW MOLDING OF HOLLOW PLASTIC WARE

Joseph M. Wilkalis and William H. Peiler, West Hartford, Conn., assignors to Plax Corporation, West Hartford, Conn., a corporation of Delaware Application February 4, 1954, Serial No. 408,206

3 Claims. (Cl. 18—5)

This invention relates to methods of forming hollow articles of organic plastic materials, such as polyethylene, but is not limited in its use specifically thereto. It may be employed in working other organic thermoplastic materials adapted to be rendered plastic by heat, or heat and pressure, and formed into hollow articles while in plastic condition.

The general object of the invention is to provide a novel method and equipment for forming such hollow articles of desired shapes and dimensions, in a simple, efficient and economical manner.

More specifically, it is an object of the invention to provide method and apparatus with which organic material in plastic condition may be formed into hollow articles, such as containers with necks of exact shapes and dimensions, adapted to be fitted with the desired type of cap or closure, such as a standard cap or closure now used on other kinds of containers. In conjunction with this object, it is a further object of the invention to form the body portion of hollow objects in such a manner as to permit control of the shape, size and distribution of material in such portion of the articles.

Generally the invention provides improvements over the practice disclosed in U.S. Patent No. 2,288,454 to Hobson.

Broadly considered, the invention involves the initial formation of the neck or neck finish of an article by "injection molding" and the subsequent formation of the body portion of the article by blow molding additional material preshaped by "extrusion."

The term "injection molding," or variations of such term, means the introduction under pressure of organic material, made plastic by heat or heat and pressure, into a mold cavity closed except where the material enters and which cavity, therefore, exactly determines the size and shape of the portion of the article formed therein. The term "extruding" or "extrusion" or variations thereof, means the feeding of such material under pressure and in plastic or working condition while only partly confined or unconfined by molding surfaces.

The invention may more clearly be understood from the following detailed description of the embodiments of the invention illustrated in the accompanying drawings, in which:

Figures 1 to 5, inclusive, are views in central vertical section of apparatus for carrying out the method depicted in several steps in said figures; and Fig. 6 is a view similar to Figs. 1 to 5 showing a modification of the apparatus there shown.

Referring to Figs. 1 to 5, the apparatus comprises an extruding device or nozzle, generally designated 1, and an inverted bottle mold unit, generally designated 2.

The extruding device or nozzle 1 is associated with an extruder or other suitable apparatus (not shown) for supplying organic plastic material in plastic or working condition. Such apparatus does not constitute part of this invention and is omitted to simplify the illustration and description of the invention.

The nozzle 1 comprises an outer sleeve 3 which may include a space or chamber (not shown) for receiving a temperature-controlling medium. Within the sleeve 3 is a hollow plunger 4 which is concentrically spaced from the sleeve 3 to provide an annular tubular passage for plastic material, as indicated at 5. The plunger 4 also may contain a chamber or passage (not shown) for the circulation of a temperature controlling medium. Preferably the lower end of the plunger 4 is cup shaped, as shown at 4a, for receiving a conforming end 6a of a mandrel 6 which is operably associated with and a part of the molding unit generally designated 2.

More particularly, the mold unit 2 is divided horizontally into three portions which, in addition to the mandrel 6, include a neck mold portion generally designated 7 and a body mold portion generally designated 8. Each of the portions 7 and 8 preferably is divided vertically into sections 7a, 7b and 8a, 8b, respectively, which are mounted on suitable supporting arms (not shown) for opening and closing the molds.

As shown in the drawings, the mandrel 6 includes passages 9 and 10 through which fluid medium may be circulated to maintain the mandrel 6 at a desired temperature. Moreover, the mandrel 6 has a central passage 11 for blowing air. The mandrel 6 is slidably supported within the bore of a concentric sleeve 12 having an upper end or edge 13 with which a seamless lip or rim may be shaped on the bottle neck 14 within the neck mold 7.

The neck mold 7 includes a contoured cavity wall for molding the outer side wall of the neck 14 of the bottle B. As shown in Fig. 1, the neck mold 7 snugly receives the neck pin mandrel 6 and the sleeve 12, all of which are presented as thus assembled to the nozzle 1 for filling with plastic material by injection to form the bottle neck 14.

The top 6a of the mandrel 6 seats tightly in the cup 4a at the bottom of the nozzle mandrel 4 during injection.

When the neck mold cavity is completely filled, as shown in Fig. 1, the neck mold 7, together with the mandrel 6 and sleeve 12, are drawn away from the nozzle 1 as shown in Fig. 2 concurrently with the extrusion of plastic tubing 15 from the nozzle 1 to a length which connects the molded bottle neck portion 14 in the neck mold 7 with the plastic in the nozzle 1.

Thereafter, as shown in Fig. 3, the mold sections 8a and 8b are closed on the tubing 15. The top of the mold sections 8a, 8b have pinching edges 16a, 16b which, when the sections 8a, 8b close, cooperate to pinch close the tubing 15 along a line on the bottom 17 of the inverted bottle B which is being molded.

The lower ends of the mold sections 8a, 8b are recessed at 18 to snugly receive the upper portion of the neck mold 7 as shown in Figs. 3 and 4 and so as to provide a continuous substantially smooth contour where the cavity walls of the neck and body molds 7 and 8 join.

Preferably, the upper surface 19 of the neck mold 7 and the conforming surface 20 of the recess 18 in the body mold 8 are conically tapered and slightly interfere when the mold 8 is closed so that the neck mold 7 firmly presses axially against the body mold 8.

The operating arms (not shown) for the molds 7 and 8 together with the mandrel 6 and sleeve 12 are operatively carried by a table 21 which preferably is rotated about an axis parallel with and spaced from the mandrel 6 and carries a plurality of the mold assemblies 2 which are successively presented to the nozzle for the formation of the bottles B therein. It will be understood that the fragmentary showing of the table 21 is sufficient illustration of operating turret and mechanism, such as is illustrated and described in U.S. Patent No. 2,349,176 for an understanding of the invention.

As shown in Fig. 4, blowing air from the mandrel passage 11 expands and holds the length of plastic tubing 15 of Fig. 3 in molding contact with the wall of the cavity of the mold 8 while the plastic hardens and sets to form the bottle B of Fig. 5.

The tops of either or both of the mold sections 8a, 8b may be provided with a knife blade 22, such as shown secured by a screw 23 to the top of the mold section 8a for limited pivotal movement. The knife 22 is biased upward by a spring 24 so that as the mold 8 passes beneath the nozzle 1, the knife 22 is resiliently pressed against and cleans the bottom surface 3a of the nozzle.

It will be understood that the knife 22 is merely illustrative of various means which may be used to remove excess plastic from the nozzle end of the nozzle 1.

The annular orifice 5 of the nozzle preferably is of substantially the same size as the neck forming cavity between the mandrel 6 and neck mold 7.

The operation of the above described apparatus will be understood generally from the description of the components and the manner in which they function. Plastic material, such as polyethylene, is introduced under heat and pressure into the nozzle 1 from the annular outlet 5 of which the material is injected into the cavity of the neck mold 7 around the neck pin mandrel 6 and against the sleeve rim 13 to form the neck portion 14 of the bottle B being made. Cooling medium preferably is circulated through passage (not shown) in the mold 7 at this time to set and complete the formation of the neck portion 14.

It will be observed that the continuous unbroken surface of the end of the sleeve 12 prevents formation of a fin across the lip or end finish of the neck 14.

Operations are now performed to develop the body of the bottle B. Beginning with the parts in the position of Fig. 1, relative bodily axial movement of the neck mold 7, together with the mandrel 6 and sleeve 12 as a unit, is effected to withdraw the unit and the neck 14 away from the nozzle 1. During the withdrawal, the nozzle 1 is maintained in axial alignment with the neck mold unit while additional plastic material is extruded from the nozzle 1 and air admitted through passage 4b or the mandrel passage 11, or both, into the extruding tube 15 to prevent its collapse. When the neck mold 7 arrives at the position shown in Fig. 2, the mold sections 8a, 8b are closed, as shown in Fig. 3, and thereafter blowing air is admitted through mandrel passageway 11 to expand the plastic material into contact with the cavity of the body mold 8 as shown in Fig. 4. The expansion may be effected while the molds 7 and 8 are aligned with the nozzle or while or after they are moved from alignment by rotation of the table 21.

After the plastic material of the bottle B has cooled and set the molds 7 and 8 may be opened and the bottle removed from the mandrel 6 in various sequences.

A preferred sequence is the following: Open mold 8 and thereafter mold 7. Next return the sleeve 12 to the position shown in Fig. 1 ahead of the mandrel 6 so that the sleeve 12 serves to strip the bottle neck 14 from the mandrel 6. It will be apparent that the mold 8 must be opened somewhat wider than shown in Fig. 5 so as not to interfere with the bottle.

If additional support is desired to prevent distortion of the neck 14, the mold 7 may be kept closed until after stripping the neck 14 from the mandrel 6.

Air pressure from the mandrel passage 11 may assist or be substituted for the relative movement of the mandrel 6 and sleeve 12, if desired, in stripping the bottle neck 14 from the mandrel.

Fig. 6 illustrates a particularly important embodiment of the invention. As there shown, the nozzle 1 discharges the plastic tubing 15 upwardly and the neck mold 7 is drawn upwardly as the tubing 15 is extruded. The sections 8a' and 8b' of the body mold 8' are upright rather than inverted as in the embodiment of Figs. 1–6.

It will be understood that if preferable, the mold 7 may be a single rather than a multi-section mold from the cavity of which a seamless neck portion of a bottle may be withdrawn by rotation of the bottle relative to the single-part mold 7 rather than by opening of sections.

Extremely good control of the extruding tubing 15 can be obtained with the embodiment shown in Fig. 6. The hottest portion of the tubing 15 which is at the nozzle 1 is not subject to the weight of an increasing amount of plastic, as in the embodiment of Figs. 1–6, and eliminates the tendency for the tubing 15 to neck at the nozzle. This tendency is particularly troublesome in the production of heavy ware.

In the development of the bottle B or other article, the proper or desirable time relation between extruding, withdrawing and blowing is maintained by suitable timing means (not shown) to secure the desired distribution of material in the neck and body portions of the article. Wall distribution may be controlled by varying the amount of material extruded during movement of the sleeve 12 relative to the nozzle 1. Suitable mechanism (not shown) also may be provided for this purpose.

Variations or changes may be made in the details of construction and in the method without departing from the scope of the claims.

Having thus described the invention, we claim:

1. A blow molding machine including a neck mold portion, a mandrel and an end of a sleeve concentric with said mandrel, said mandrel and sleeve being slidably received within said neck mold portion to define a cavity in which to injection mold a hollow neck portion of a container, the end of said sleeve serving to form the lip of the neck, an annular nozzle axially aligned with said neck mold portion to inject plastic material into said cavity and to extrude a tube of said plastic integral with the injection molded neck, and a body mold cooperable with the tube of plastic extruded from said nozzle and in which to blow mold the extruded tube, said neck mold portion, mandrel and sleeve being movable individually relative to each other and as a unit in an axial direction relative to the nozzle, said nozzle being mounted to inject and extrude plastic in an upward direction, and said neck mold portion, mandrel, sleeve and body mold being positioned above said nozzle.

2. A blow molding machine as recited in claim 1 and including a rotary turret table for the neck mold portion, mandrel, sleeve and body mold, all of which are located beneath the turret table.

3. A blow molding machine including a neck mold portion, a mandrel and an end of a sleeve concentric with said mandrel, said mandrel and sleeve being slidably received within said neck mold portion to define a cavity in which to injection mold a hollow neck of a container, the end of said sleeve serving to form the lip of the neck, an annular nozzle axially aligned with said neck mold portion to inject plastic material into said cavity and to extrude a tube of said plastic integral with the injection molded neck, and a body mold cooperable with the tube of plastic extruded from said nozzle and in which to blow mold the extruded tube, said neck mold portion, mandrel and sleeve being movable individually relative to each other and as a unit in an axial direction relative to the nozzle, said nozzle being mounted to inject and extrude plastic toward said neck mold portion, and said neck mold portion, mandrel, sleeve and body mold being positioned to receive plastic extruded from said nozzle.

References Cited in the file of this patent

UNITED STATES PATENTS

| | | |
|---|---|---|
| Re. 23,564 | Hobson | Oct. 14, 1952 |
| 2,288,454 | Hobson | June 30, 1942 |
| 2,349,177 | Kopitke | May 16, 1944 |
| 2,378,586 | Schultz | June 19, 1945 |
| 2,562,523 | Brunet | July 31, 1951 |
| 2,597,558 | Bailey | May 20, 1952 |
| 2,706,308 | Lorenz | Apr. 19, 1955 |
| 2,810,934 | Bailey | Oct. 29, 1957 |

FOREIGN PATENTS

| | | |
|---|---|---|
| 1,029,586 | France | Mar. 11, 1953 |
| 692,590 | Great Britain | June 10, 1953 |